May 3, 1932.  F. P. McBERTY  1,857,060
ELECTRIC WELDER
Filed April 5, 1928  11 Sheets-Sheet 5

May 3, 1932.  F. P. McBERTY  1,857,060
ELECTRIC WELDER
Filed April 5, 1928   11 Sheets-Sheet 7

Inventor
F. P. McBerty

Attorneys.

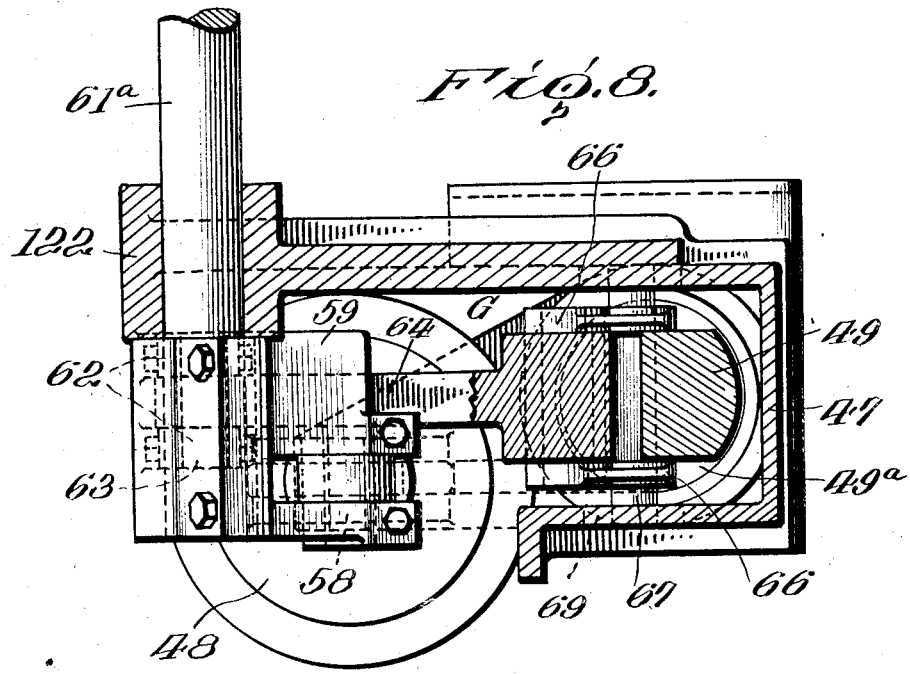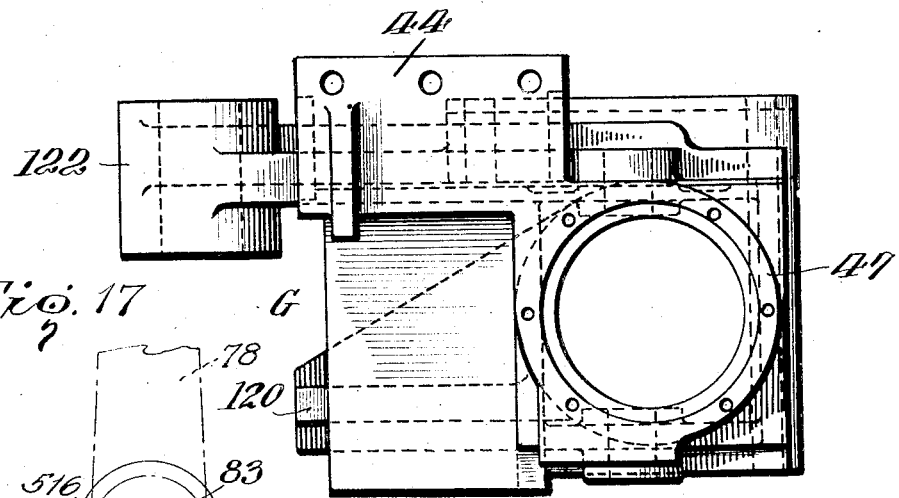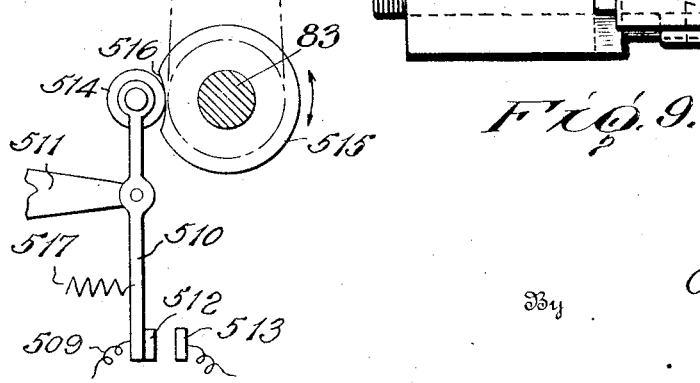

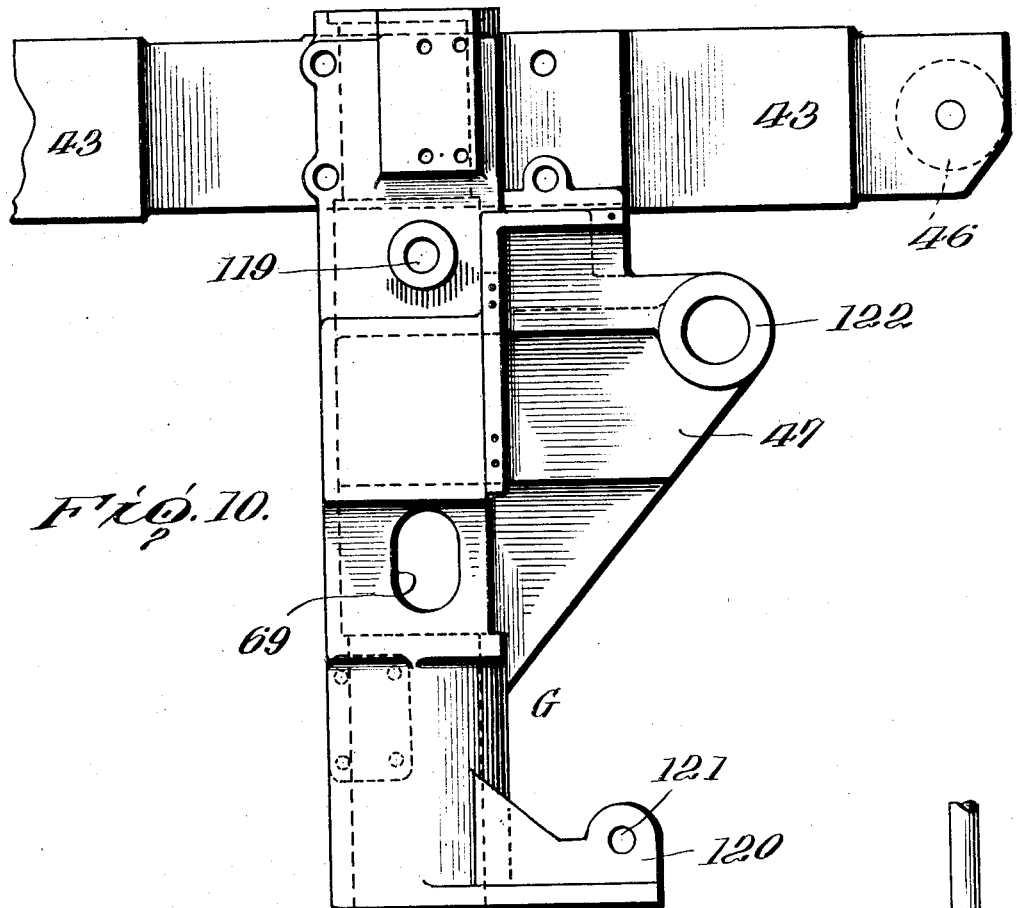
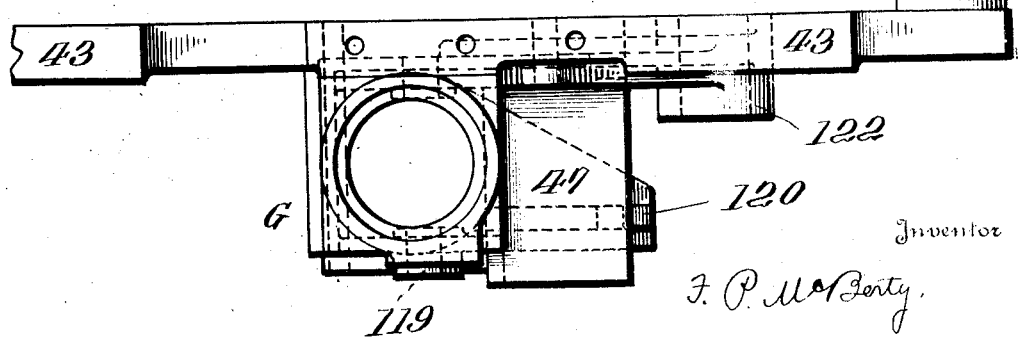

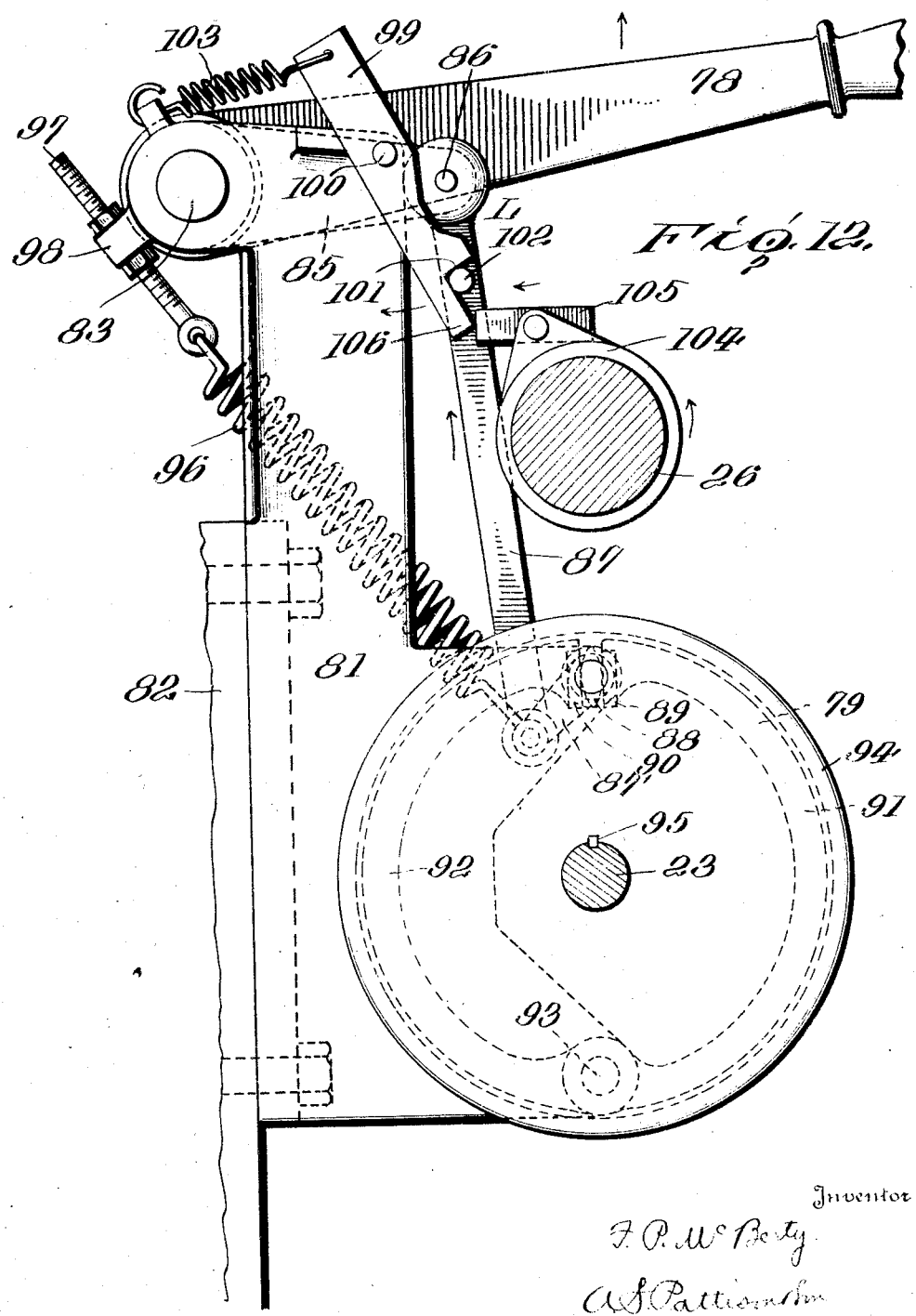

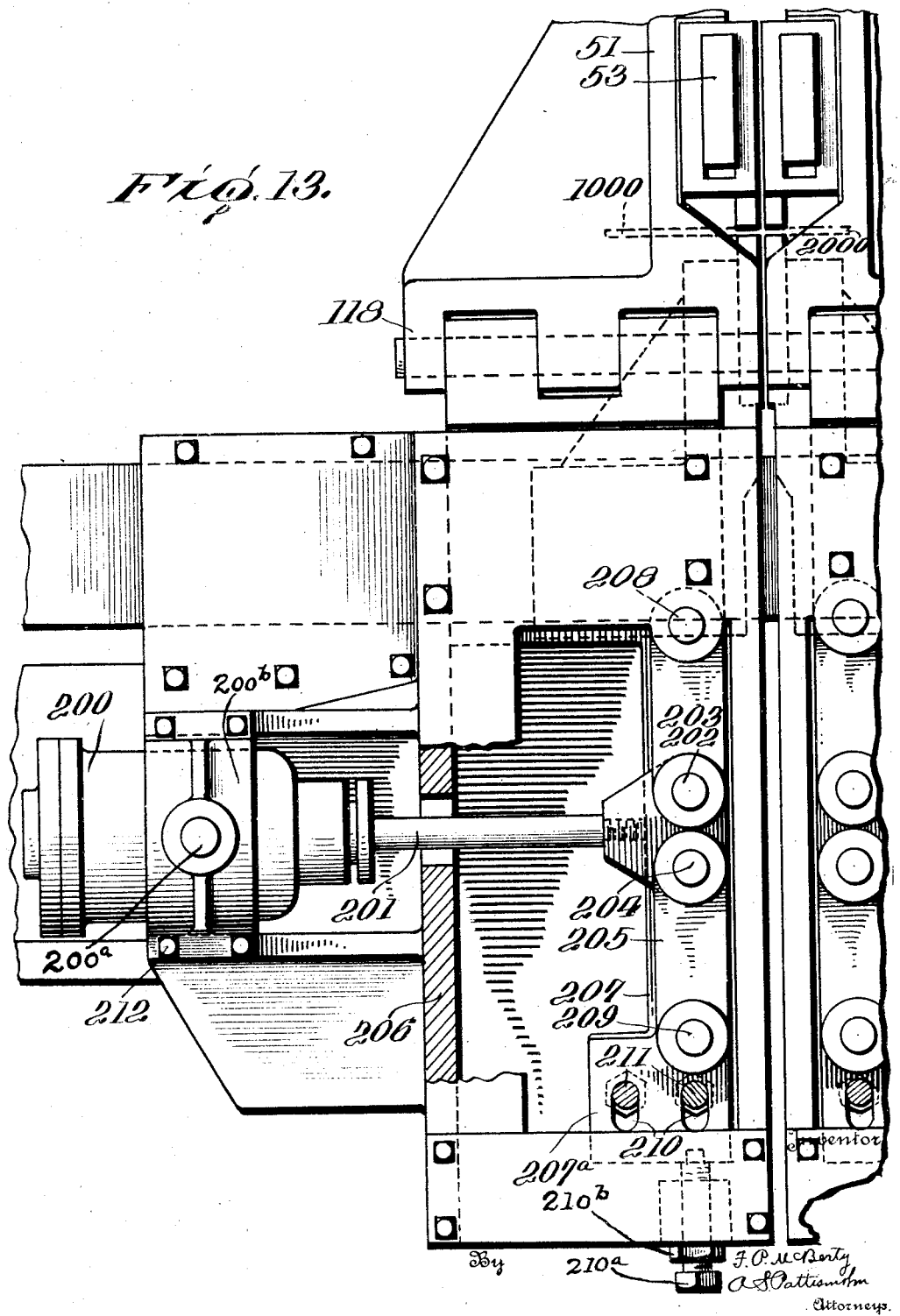

Patented May 3, 1932

1,857,060

UNITED STATES PATENT OFFICE

FRED P. McBERTY, OF WARREN, OHIO

ELECTRIC WELDER

Application filed April 5, 1928. Serial No. 267,605.

This invention relates to improvements in electric welders and is directed more particularly to an electric welding apparatus of the so-called "flash" type of welder, and is particularly designed and adapted to the welding together of the side and back portions of a metal automobile body.

In the manufacture of automobile bodies it is essential that the body be made of a plurality of pieces. In a metal body the rear ends of the sides of the body are united to the outer edges of the body back. The meeting edges of the sides and back are of considerable length, often being more than fifty inches throughout the length of the abutting edges. Up until the present time it has been usually customary to unite the sides and backs of bodies by a gas or an acetylene weld. This method of uniting the parts together is quite expensive because it is slow and additionally is objectionable because it requires highly experienced operators to make a successful job.

Electric welding is not new and has been thought of before in connection with the uniting of automobile metal body portions, but so far as I am aware, no one has been able to devise or discover a machine which will operate successfully.

After extended experimentation, tests and the expenditure of a large amount of both time and money, I have devised a welding machine which is highly efficient in the welding together of automobile body parts.

In the welding art it has been difficult to make a successful weld when the joint abutment is of considerable length. In making a weld of considerable length the difficulty has been in bringing the edges of the pieces to be united together in alinement. An exact alinement is essential to prevent the burning out of the metal. If the pieces engage or abut at one point in the length of the weld before they meet at some other remote point, the metal will burn out at its point of engagement before the remote point has been brought to a welding temperature.

Great difficulty has also been experienced by reason of the fact that the weld, when completed, must be sufficiently strong to withstand rigid tests and still not be broken at any point along the entire length of the weld.

Difficulty has also been experienced in devising and discovering a machine which will be automatic in a sufficient number of steps of the operation to make it a commercial success.

Other difficulties experienced in respect to electric welding machines for work of this character will be pointed out in the following detailed description of the invention.

The primary object of the present invention is the provision of an electric welding machine for welding the metal parts composing an automobile body together, which is to a very large extent automatic in its operation.

Another and further object of the invention is the provision of a novel construction of combined toggle and clamping means for clamping the body parts to the electrodes.

A further object of the invention is the provision of an equalizing connection between the clamping and actuating mechanisms at the opposite sides of the clamps for assuring an equal pressure upon the clamps throughout their entire length.

Another and further object of the invention is the provision of a machine of the character described which is built in two units, both of which are so mounted as to have an almost universal adjustment whereby the two units can be so set as to operate upon automobile bodies of different shapes and contours.

A still further object of the invention is the provision of a novel control means for starting the operation of the machine and automatically controlling the operation of the machine throughout one cycle of operation.

A still further object of the invention is the discovery of a new method and a novel machine for carrying out the method in respect to the welding together of automobile metal body parts.

Other further objects of the invention and novel features of construction of both the machine and the method practiced thereby, will be more specifically pointed out in the following description and accompanying drawings.

In the drawings:

Figure 8 is a horizontal sectional view taken on the line 8—8 of Figure 7, looking in the direction indicated by arrow.

Figure 9 is a top plan view of Figure 8.

Figure 10 is a detail perspective view of the casting carrying the toggle operating mechanism and the slide bar carrying the movable electrode of one of the units.

Figure 11 is a top plan view of Figure 10.

Figure 12 is an enlarged perspective view showing the automatic starting, stopping and controlling mechanism for one of the units.

Figure 13 is an enlarged detail side view of a modified form of toggle for operating the clamps of one unit of the machine, a portion being broken away and shown in vertical section.

Figure 14 is a diagrammatic view illustrating the manner in which the automobile body back and side portions are clamped upon the stationary and movable electrodes.

Figure 15 is a diagrammatic view illustrating the position assumed by the vehicle body back and side portions at the time they are upset and the actual welding of the parts takes place.

Figure 16 is a diagrammatic view of the automatically operated switch for controlling the transformer circuit.

Figure 17 is a diagrammatic view of the automatically operated switch for controlling the driving motor circuit.

Figure 1:
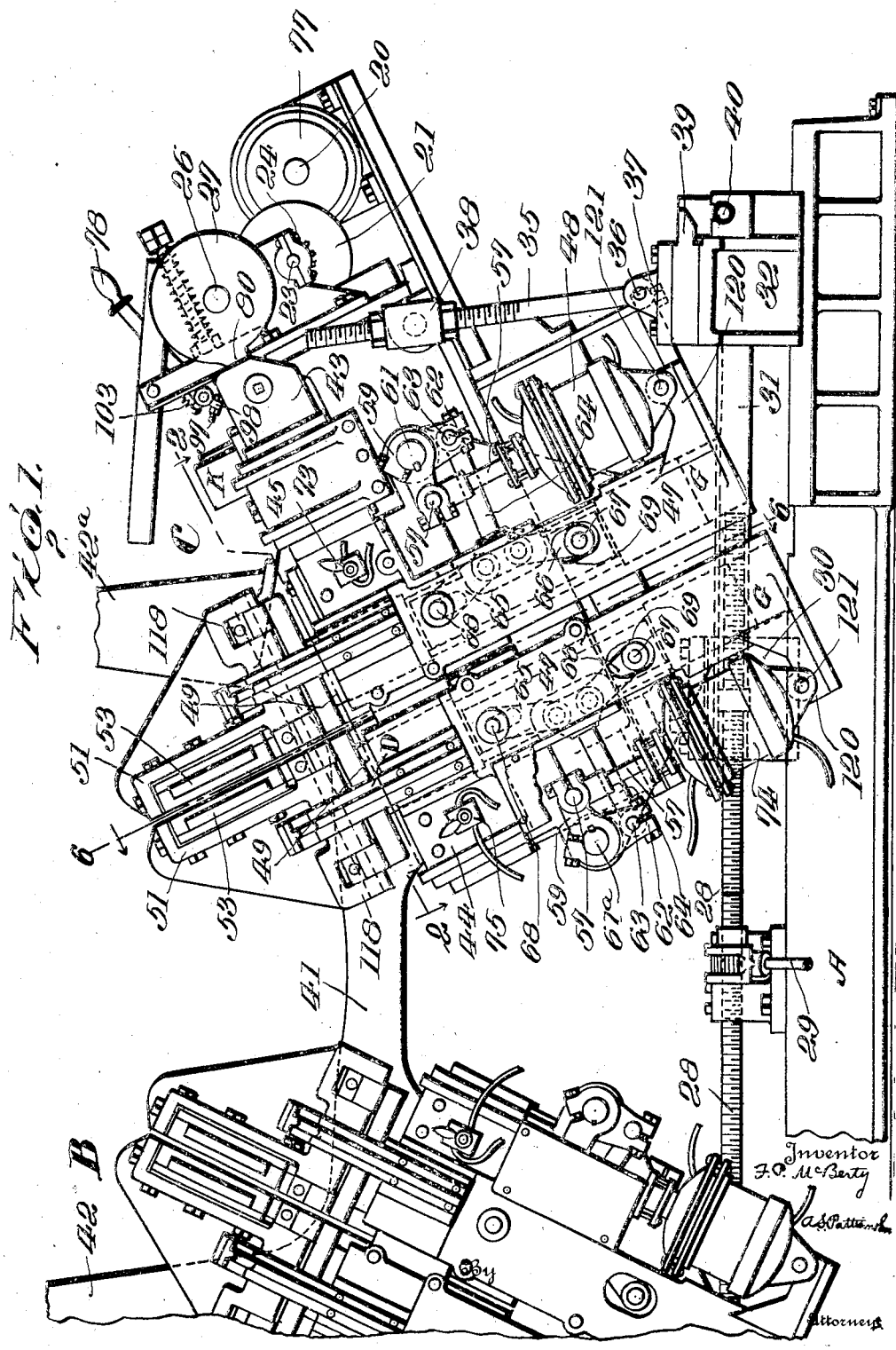
Figure 1 is a view in side elevation showing a complete machine comprising two units, a portion of one unit being broken away.

Describing the invention in broad terms, there is provided a base A upon which is suitably mounted two welding units making up the machine, these units being designated by letters B and C. With reference to Figure 1, B represents the left hand unit and C the right hand unit.

These two units are identical in construction and operation and in the description of the machine it will be understood that when its several parts and mechanisms are described, that each of the units carries devices, parts, and mechanisms which are all identical in construction.

The units are each provided with a fixed electrode D and a movable electrode E, the particular construction of which will be hereinafter more specifically described. Cooperating with the electrodes are clamps D' for the fixed electrode and E' for the movable electrode.

These clamps are for the purpose of clamping the edges of the automobile body parts which are placed upon the machine for the purpose of welding them into a single structure.

The toggle mechanism for the fixed electrode clamp is designated at F and the toggle for the movable electrode clamp is designated at G.

There is a source of electric current supply (not shown) for the supply of current to the driving motor 77 mounted upon the rear end of each of the units, and this operating motor is for the purpose of driving the motor shaft 20 which in turn drives the gears in the gear reduction box 21 through the medium of a driving chain 22 which interconnects the motor shaft 20 and the shaft 23 which terminates in the gear reduction box.

The shaft 23, in the gear reduction box, carries a gear 24 meshing with a gear 25 carried upon the shaft 26 which shaft at its outer end carries the cams 27.

The cams 27 are for the purpose of driving or moving the movable electrodes of the units downwardly or inwardly towards the fixed electrodes, causing the adjacent edges of the vehicle body parts to be brought into abutment.

A cylinder K provided with a suitable piston is provided and through the medium of air pressure against the piston of this cylinder, the movable electrode is carried back to its elevated position after each operation of the machine.

A combined starting, controlling and stopping mechanism is illustrated in Figures 12, 16 and 17 of the drawings and is designated entirely by L.

Figures 14 and 15 illustrate back and side portions of the vehicle body. The back portion carries the numeral 1000 and the side portion the numeral 2000.

The body back portion of the vehicle is supported upon and between the two fixed electrodes of the two units, while the ones constituting the body side portions are supported upon the movable electrodes of each of the units in a manner which will be specifically and fully described hereinafter.

The machine is made up of a great many parts, although it is not really complicated. The description thus far has described the essential features of the invention in a broad manner and a detailed description of the component parts of the machine, the operation of the machine and the method practiced by the machine will now be given.

In reading and considering the following description of the machine and its parts it will be realized that departures from the actual and specific construction shown can be made without departing from the spirit of the invention as set forth in the accompanying claims.

In carrying out the invention and method it is first necessary to adjust the two welding machines or units properly in respect to one another so that they can operate upon the particular work to be done.

The two units can be moved towards and away from each other through the medium of the elongated screw 28 and the ratchet jack 29 which is mounted upon the base A intermediate the two units. The screw 28 passes through the blocks 30 which support the front ends of the units and which are slidable upon the base. By operating the jack the two units can be pulled towards one another as the blocks 30 at the front end of the machine are connected by a suitable framework 31 to the transverse supporting members or blocks 32 at the rear ends of the units which are also slidable upon the base A.

The blocks 30 at the front ends of the units carry removable caps 33 the upper faces of which are shaped to receive the ball shaped members 34 which are in turn attached to the under side of the front ends of the units. This construction gives the front ends of the units a universal support which unables the front ends of the units to be moved into any desirable position upon the supporting cap.

The rear ends of the units are supported upon externally threaded arms 35, the lower ends of which are pivotally supported as at 36 in bearings 37 mounted upon the upper face of the transverse member 32 while the upper ends pass through suitable turn-buckles 38. It will be understood that there is an arm 35 at each side of the machine and that through this construction the rear ends of the units can be raised and lowered as described.

The bearing 37 is bolted to a transverse slide member 39 and through the medium of a suitable transversely extending screw 40 the rear ends of the units can be moved transverse the base the front ends of the units swinging on the swivel ball or universal support 34.

Through the arrangement of support described, it will be seen that the units have a wide degree of adjustment in respect to one another which makes it possible for the machine to be adjusted to operate upon jobs or work of diversified characters.

As the machine is primarily designed to weld the back and sides of automobile bodies the description will deal with this particular class of job.

By reference to Figure 1 it will be seen that a jig 41 spans the space between the two units and is for the purpose of supporting the automobile body back 1000 in place with the vertical edges of the back extending slightly beyond the fixed electrodes D while vertical jigs 42 and 42ª are for the purpose of supporting the sides of the automobile body in place upon the movable electrodes E with the vertical edges of the sides extending forwardly beyond the electrodes.

Extending throughout the length at each side of each unit is a slide 43 which passes through and is held in place by suitable front guides 44 and rear guides 45. At the inner sides of their rear ends these slides carry cam rollers 46 which are engaged by the cams 27 carried at the outer ends of the cam shaft 26.

Suitably attached to the slide at each side of the machine and movable therewith are castings 47 which carry, in addition to the movable electrode toggles G, the cylinders 48 for operating these toggles. The purpose of these toggles is to operate the clamps which form a part of both the fixed and movable electrodes.

Figure 6:
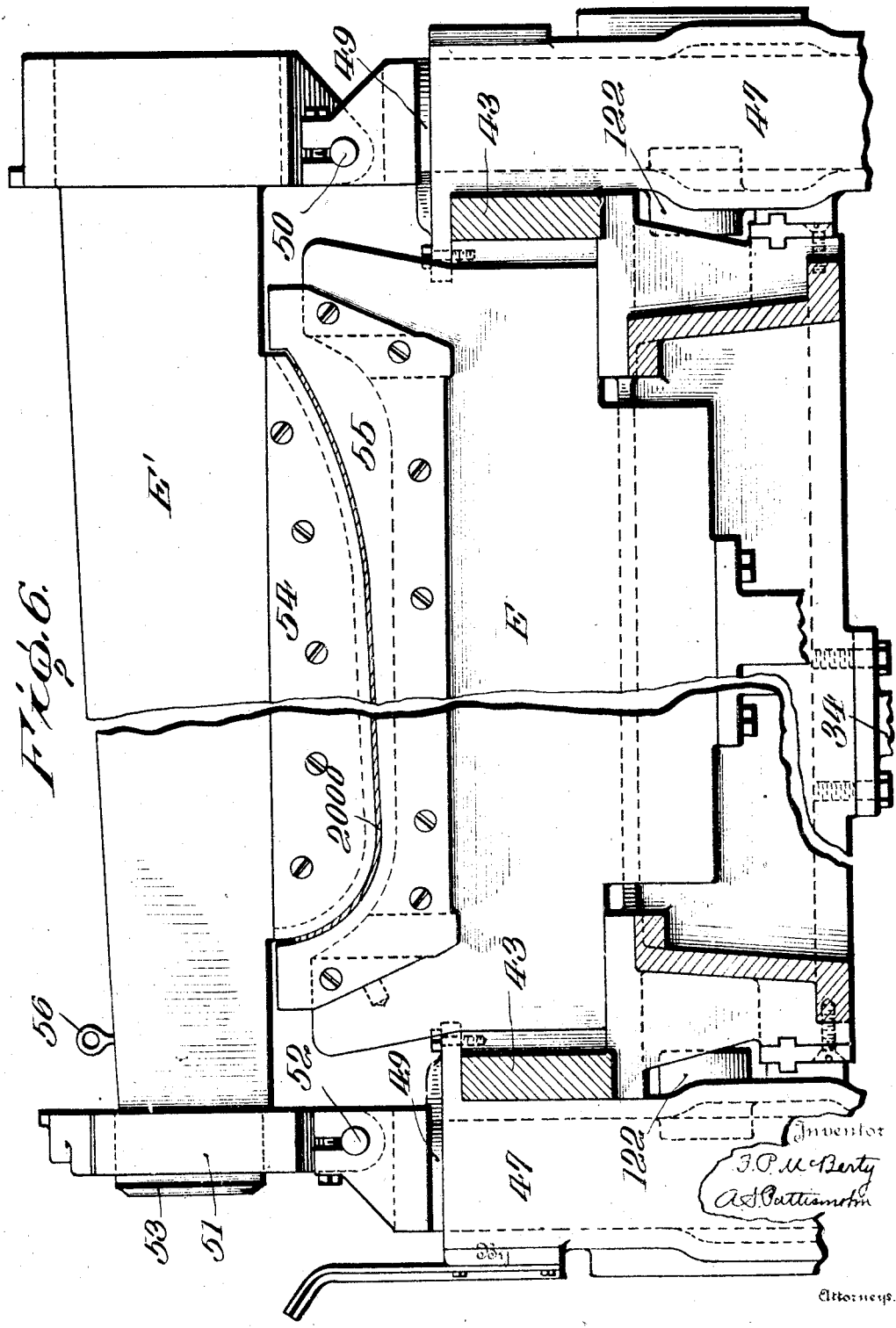
Figure 6 is a transverse vertical sectional view taken on the line 6—6 of Figure 1.

Movable in the castings 47 in much the same fashion as cylinders are plungers 49 and by reference to Figure 6 it will be seen that the clamps E′ for the movable electrodes are bars extending entirely transverse the unit above the electrode and that at one end this bar clamp is pivotally supported and attached to the plunger 49 as at 50 while at the other end a swinging lock 51 is provided.

The lock 51 is pivotally attached and supported upon the upper end of the plunger 49 as at 52 and the lock is provided with an opening to receive and hold the outer end 53 of the clamp. The lower face of the clamp bar is provided with a detachable die 54 which cooperates with the removable die 55 carried by the movable electrode E so that when the clamp is in place the vertical edge of the vehicle body side portion 2000 is clamped firmly in place to be movable with the electrode.

The clamp bars are very heavy, inasmuch as 20 to 50 tons pressure is applied to them and as they are manipulated manually they are provided with an eye 56 to which it is intended to attach a cable extending over a pulley with a counter weight so that when the locks 51 are swung downwardly to release the clamp bars they can be swung upwardly without great effort.

*Toggle mechanism*

The mechanism for operating and applying the pressure to the clamps comprises the cylinder 48 which carries a suitable piston having an upwardly extending elongated piston rod 57. Through suitable hose 58 and 59 air pressure can be delivered to either the upper or lower sides of the piston. The upper end of the piston rod 57 is pivotally attached as at 58 to the arm 59 which is keyed as at 60 to the shaft 61 which extends transversely across the front end of the unit. Depending downwardly from the shaft 61 and rotatable therewith is a second arm 62 having pivotal connection at 63 with a rearwardly extending arm 64 which carries the pivotally mounted links 65 and 66, all of which clearly appears in Figure 7 of the drawings.

The lower link 66 has its free end pivotally attached to the pin or stub shaft 67 carried by the lower end of the plunger 49 which plunger incidentally has a lower cylinder like portion 49ª which slides in the lower end of the casting 47. This stub shaft extends outwardly through the elongated opening 69 in the casting 47 and is slidable therein when the plunger reciprocates. The free end of the link 65 is pivotally connected to the stub shaft 68 which is rigidly supported in the openings 119 adjacent the upper end of the casting 47. The stub shaft 68 passes through an elongated opening in the upper end of the plunger 49 to permit reciprocation of the plunger in respect to the stub shaft 68. The plungers 49 and 49ª are integral and reciprocate together.

It will be understood that a similar construction to that just described is provided at each side of the unit and that the shaft 61 which I have termed an "equalizing bar" extends transverse the front end of the unit and supports the arms 59 and 62 at each side of the unit.

Figure 7:
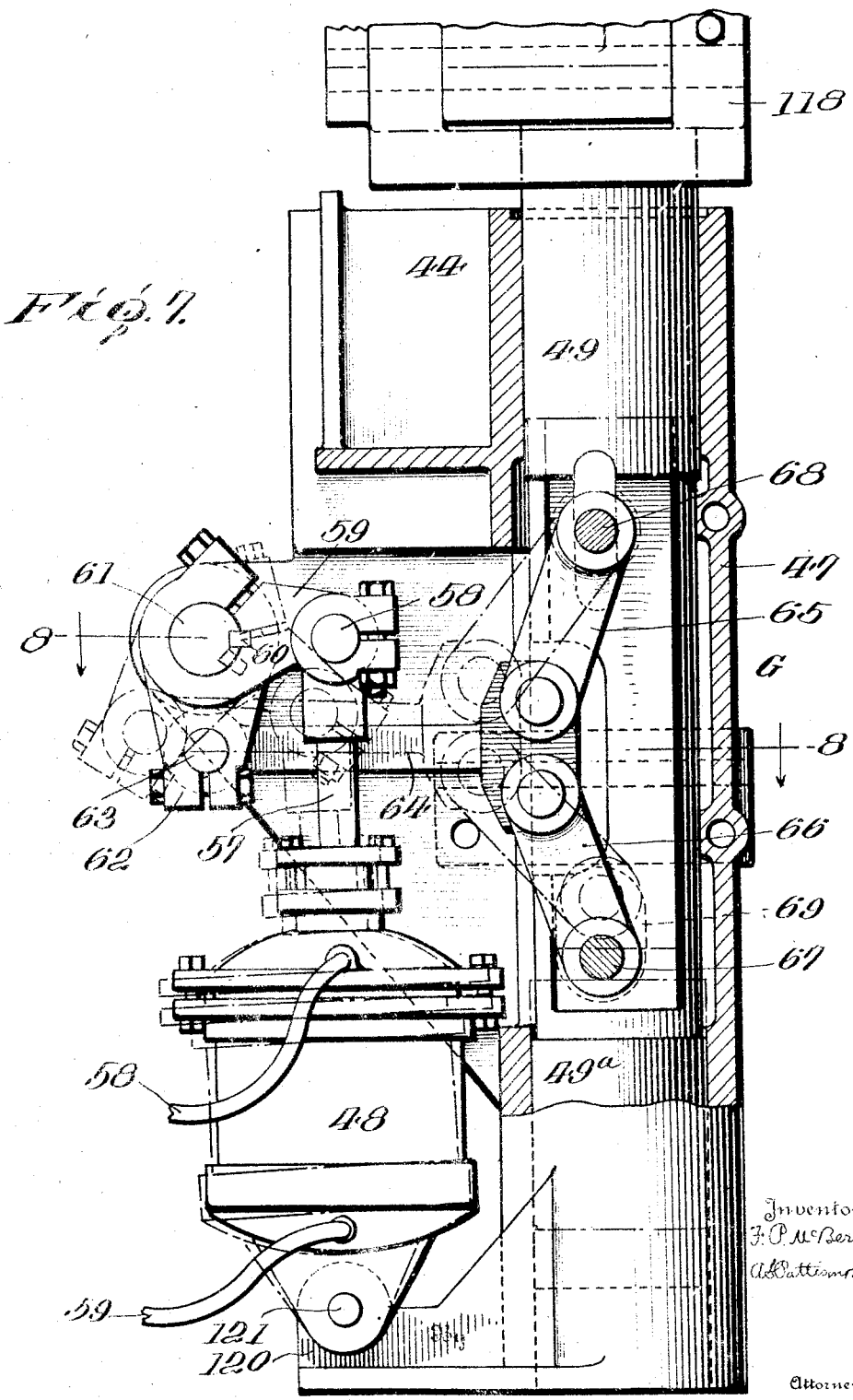
Figure 7 is an enlarged side view illustrating the clamp operating toggle and equalizing bar, a portion of the view being broken away and shown in vertical section.

From the foregoing it will be seen that when air is delivered to the upper side of the piston the parts assume the position shown in dotted lines in Figure 7 and the clamp is released because the plungers are lifted. When air is delivered to the lower side of the piston the parts assume the position shown in full line in Figure 7 and the clamp is pulled downwardly under a great pressure. When the parts are in the position shown in dotted line an upward pull is exerted on plunger 49 through the links 55 and 56 which elevates the plunger since 68 is stationarily held in the casting 47.

The equalizing bar is an important feature of this construction as it is absolutely essential to clamp the vertical body portions equally throughout the length of the dies to prevent any crimping, buckling or pulling of the metal. If the equalizing bar is eliminated the action of the cylinders at the opposite sides of the unit would not be simultaneous and a buckling or pulling of the metal would result. With the use of the equalizing bar the toggle will operate simultaneously and exactly alike at both sides of the unit even though air should reach only one of the cylinders. This is necessarily so because the shaft or equalizing bar 61 is fixed to both of the arms 59 and 62 and when the shaft is rotated these arms at both sides of the unit must act simultaneously.

It will be readily understood that as the plungers move up and down the clamp bar must necessarily likewise move up and down because of its attachment to the upper ends of the plungers.

A toggle arrangement such as just described is used on each unit in respect to the clamp of both the fixed and movable electrode. As the constructions are identical for both the movable and fixed electrodes no further description thereof will be given. By reference to Figure 4 it will be seen that the equalizing bar for the toggle of the fixed electrode is designated by the numeral 61ª.

The valves, which are manually operated, for controlling the delivery of air to the cylinders 48 for the rear or movable electrode toggle mechanism is designated at 73 of Figure 1 and the valve for the cylinders 74 of the fixed electrode toggle clamp is designated at 75.

The equalizing bar effects a very great saving in the dies from the standpoint of wear or injury. A set of dies is quite expensive and the saving of wear and injury to the dies is important from the standpoint of economical operation of the machine.

*Transformer*

Figure 4:
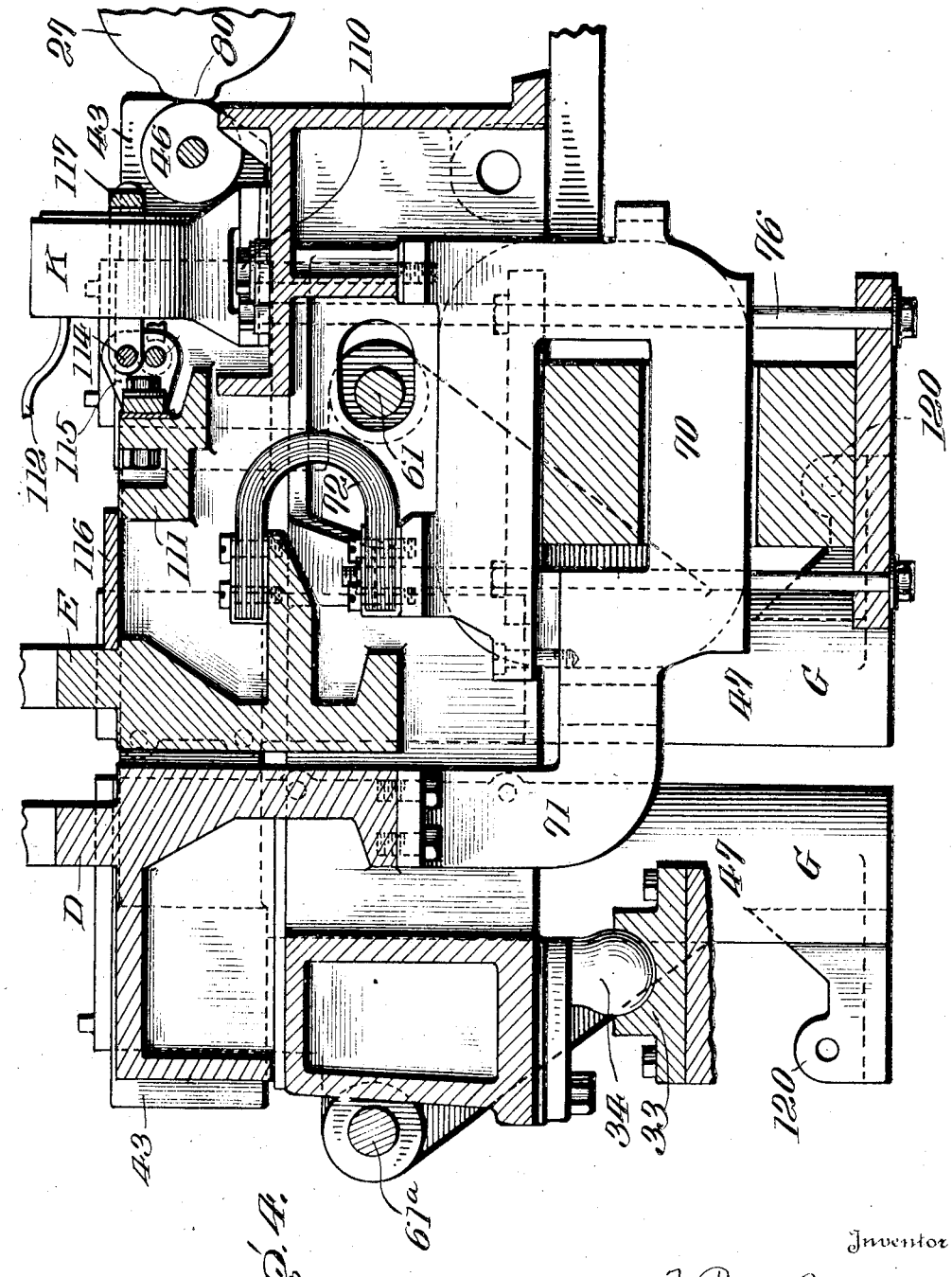
Figure 4 is a longitudinal vertical sectional view taken on the line 4—4 of Figure 2.
Figure 5:
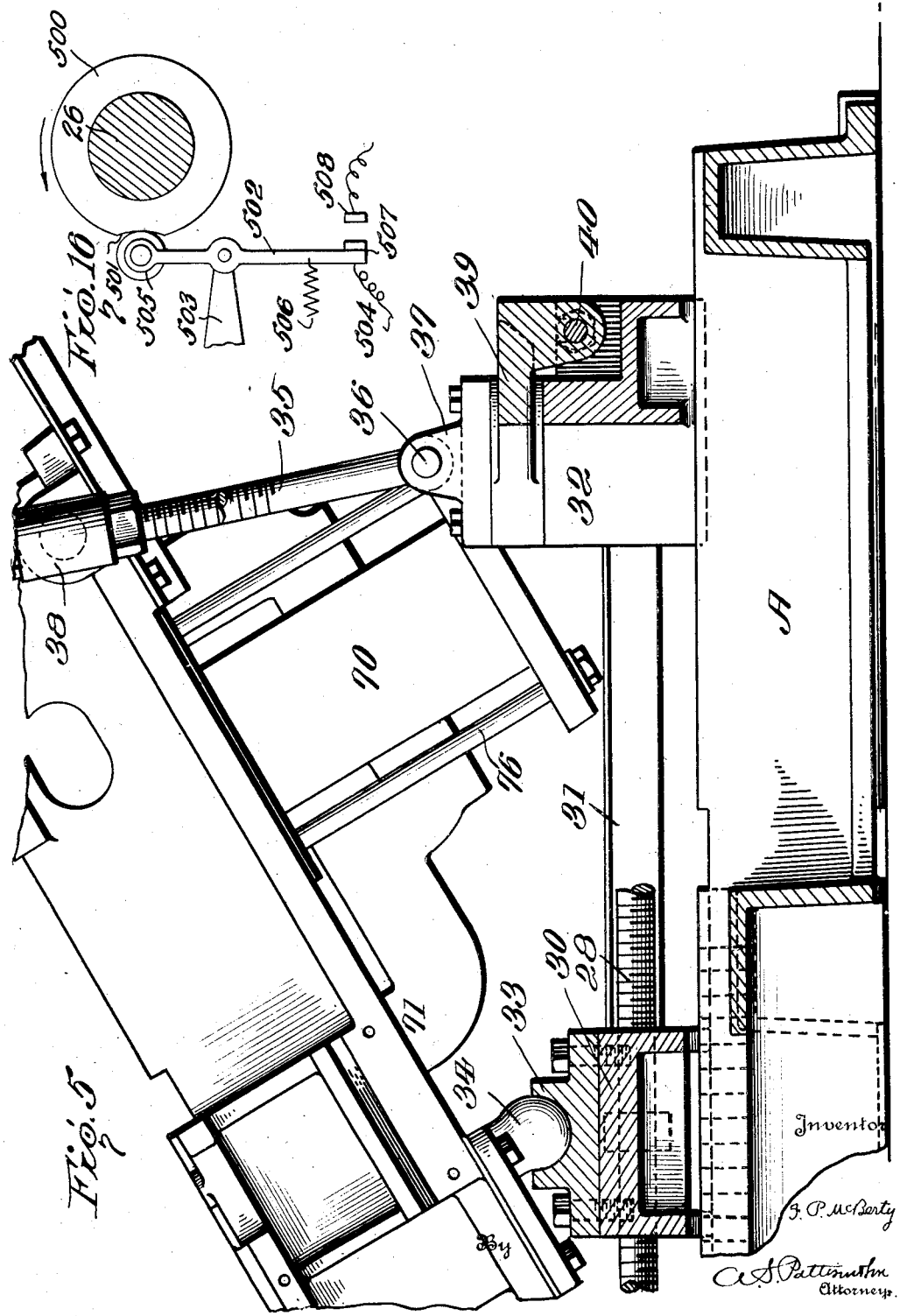
Figure 5 is a view in side elevation illustrating the manner in which one of the units is adjustably supported, a proportion of the view being shown in vertical section.

In all welding machines a transformer is necessary and in the present apparatus the transformer is best seen in Figure 4 of the drawings and is designated at 70. Here it will be seen that a suitable lead 71 carries current to the fixed electrode D whereas a flexible connection 72 is used for delivering current to the movable electrode E. This flexible connection is necessary by reason of the movement backward and forward of the combined electrode and die E.

The transformer is held in place by suitable bolts 76.

Current is delivered to the transformer through a suitable lead from a source of current supply (not shown) usually brought into the factory or place where the machine is operating. A switch (not shown) is also provided for turning on the current to the transformer when either of the units is to be operated.

Although it is not intended to operate both units to weld at the same time both units could weld at the same time were two transformers provided with a sufficient line capacity. This necessitates quite an elaborate electrical equipment and runs the cost up very considerable and would not ordinarily be used. As each weld made by each unit requires only about five seconds one transformer is usually used and one unit operated at a time to reduce the kilowatt charge.

Driving mechanism

Figure 2:
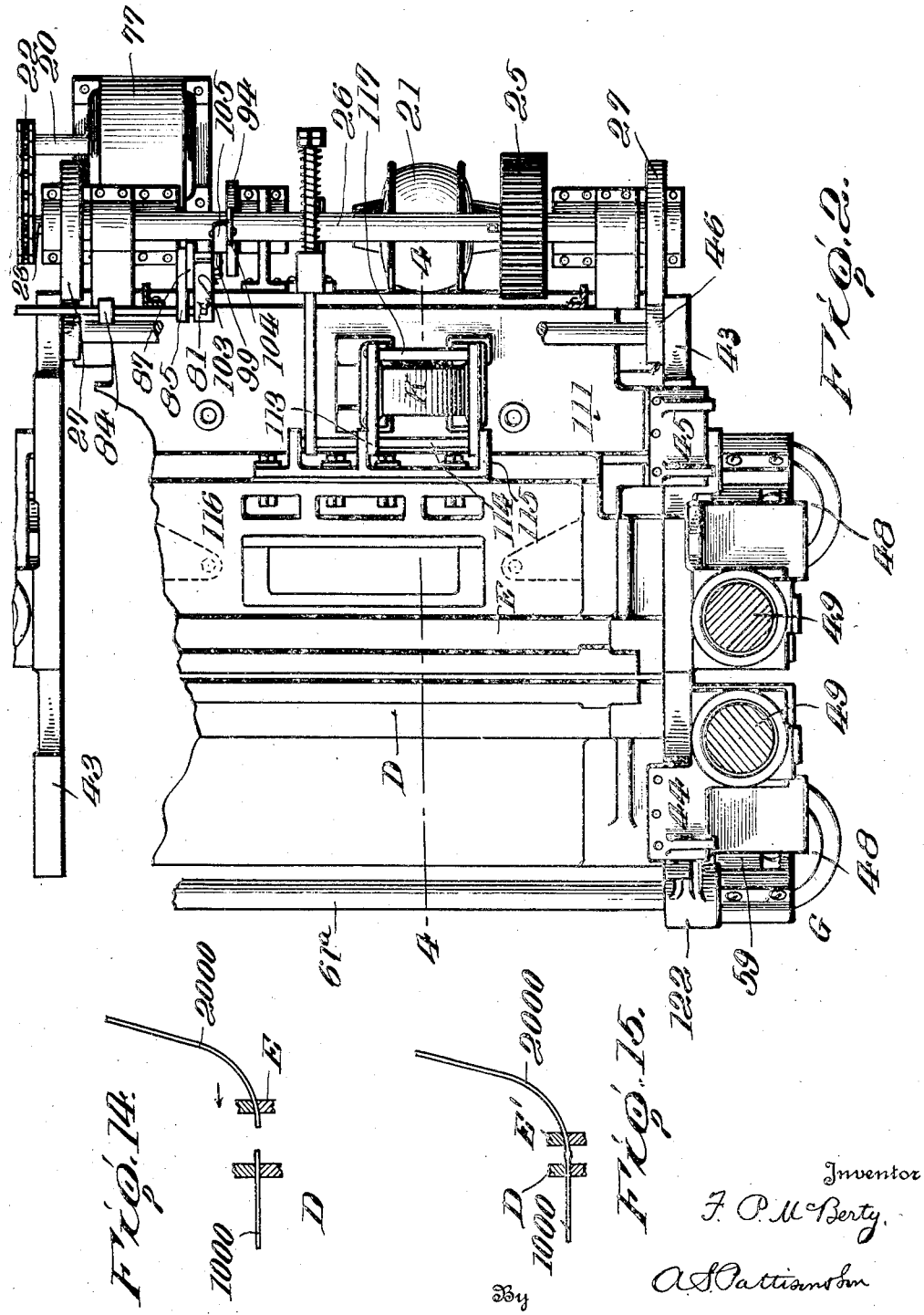
Figure 2 is a top plan view taken on the line 2—2 of Figure 1.
Figure 3:
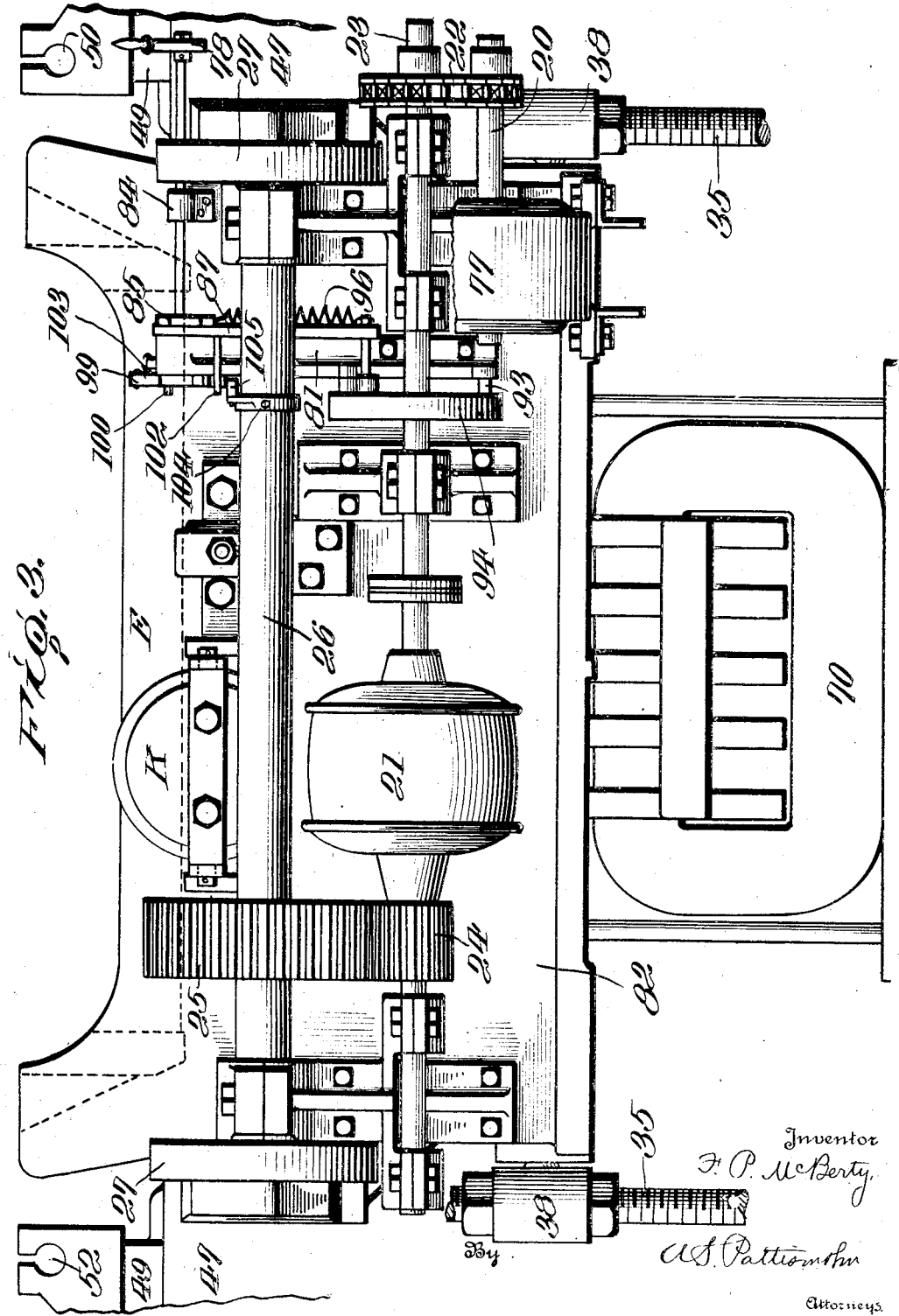
Figure 3 is a rear view of one of the units making up the machine.

The mechanism for driving the units best appears in Figures 2 and 3 of the drawings.

Here it will be seen that the initial motive power of each unit resides in the electrical motor 77 which through the shaft 20, chain 22 and shaft 23 rotates the gears in the gear reduction box 21 and through the gears 24 and 25 rotate the cam shaft 26 carrying the cams 27.

When it is desired to put a unit through one cycle of operation the control handle 78 is depressed which releases the brake 79 in a manner which will be hereinafter more fully described, and also turns on the current to the motor 77.

When the motor 77 operating the cam shaft is rotated the slide 43 carrying the movable electrode and its clamp as well as the casting 47 carrying the clamp operating toggle for this electrode, moves slowly downward or forward towards the fixed electrode.

It will be understand that the current has been turned on to the transformer.

The shape of the cam 27 (see Figure 4) is such that the high portion 80 of the cam reaches the cam roller 43 at a time just before the edges of the back portion of the body clamped in position upon the fixed electrode dies are abutted by the adjacent edge of the body side portion which is clamped upon the movable electrode. When the high portion 80 of the cam engages the cam roller the slide is given a final sudden kick forward and this final kick causes the edges of the back and body portion to come into abutment and to be slightly upset, as appears in Figure 15 of the drawings. This upsetting and abutting of the metal edges of the body portion is maintained together with the application of the electric welding current for a short period of time and causes a further heating of the metal which causes a perfect weld of great strength throughout the length of the abutting edges of the sheets.

As the edges of the metal body portions approach each other closely and lightly touch each other at different points, and before the time the final sudden kick occurs, the current arcs or flashes between the edges and causes an intense heating of the edges of the body portion which facilitates the welding and from which flash this type of welding gets name of "flash welding".

Immediately upon the completion of the "kick" the current to the driving motor is cut off and the brake 79 automatically applied, as will be described under the heading of automatic starting, stopping and controlling mechanism.

This partial description of operation will be elaborated upon under the heading of description of operation wherein a complete cycle of operation of the machine will be given.

Automatic starting, stopping and controlling mechanism

An enlarged view of this mechanism appears in Figure 12 of the drawings taken in conjunction with Figures 16 and 17 and is also partially shown in Figs. 2 and 3 of the drawings.

It will be seen that there is a general supporting bracket 81 which is suitably attached to a rear portion 82 of the unit. A shaft 83 is rotatably supported upon the upper end of this bracket and extends outwardly through a suitable bearing 84 (see Figure 3) and carries on its outer end the control handle 78. The inner end of this shaft carries a fixed arm 85 having pivotal connection at 86 with a downwardly extending rod 87, the lower end of which is provided with a pivotal supported link 87' carrying in its end a cam or wedge 88 positioned between the ends 89 and 90 of the internal brake 79. This internal brake is made in two pieces 91 and 92 pivotally connected at 93. These internal brake members operate against a drum 94 keyed as at 95 to the shaft 23.

A coil spring 96 has one end attached to the lower end of the rod 87 while the upper end of the spring is adjustably connected through the medium of a screw 97 passing through a threaded opening 98 which in turn is an integral part of the arm 85 and exerts a normal outward and upward pull upon the rod 87.

This normal outward and upward pull upon the rod 97 would tend to apply the brake but is prevented from doing so through the medium of the lock bar 99. This lock bar is pivotally supported at 100 upon the upper end of the bracket 81 and has in its lower end an L-shaped cut out portion 101 which engages the pin 102 carried adjacent the upper end of the rod 87 and is held normally in engagement with that pin through the medium of the spring tension of the coil spring 103.

The cam shaft 26 carries a supplemental cam 104 upon which is pivotally mounted a trigger 105 adapted to engage the lower end 106 of the lock bar 99 when the cam shaft 26 is rotated.

With the parts in the position shown in Figure 12 the operator has depressed the handle 78 thus releasing the brake which is normally on, and has additionally automatically turned on the current to the operating motor 77, as will be hereinafter described.

When the operating motor has driven the cam shaft one revolution the weld has been completed and the supplemental cam 104 has come into the position shown in Figure 12 and rotated slightly past that position to cause the trigger 105 to engage the lower end of the lock bar and cause the disengagement of the lock bar with the pin 102, thus permitting the spring 96 to pull upwardly on the rod 87 thus returning the handle 78 to its original position and at the same time causing the cam or wedge 88 to expand the brake parts and apply the brake to the drum, the drum being attached to the shaft 23 stops the entire rotation of the driving mechanism and at the same time cuts off the current to the driving motor.

Figures 16 and 17 diagrammatically illustrate the manner of automatically controlling the current delivered to the driving motor and the transformer.

Referring to Fig. 16, it will be seen that the main cam-shaft 26 carries a cam 500 having a low spot or depression 501. A switch arm 502 is pivotally mounted upon a bracket 503 attached to the face 82 of the unit and positions the switch arm 502 between the cam-shaft 26 and the face of the unit. In this figure of the drawings the transformer circuit 504 is shown broken as the roller 505, at the upper end of the switch arm, is in the depression 501, thus permitting the spring 506 to start the contact members 507 and 509. When the current is delivered to the driving motor and the cam shaft 26 rotates, the roller 505 will ride up on the high portion of the cam 500 and close the transformer circuit, which circuit will remain closed until the roller 505 is again in the depression 501 at which time the welding operation has been completed.

By reference to Fig. 17, it will be seen that the electric circuit 509 to the driving motor is controlled automatically through a similar mechanism. In this figure of the drawings, a switch arm 510 is pivotally supported upon a bracket 511 having attachment to the unit face 82. At its lower ends this switch arm carries a contact member 512 for making and breaking the circuit through the contact member 513. At its upper end the switch arm carries a roller 514, which engages a cam 515 carried by the shaft 83, which shaft is oscillated by the control handle 78. In this figure of the drawings the handle 78 is shown in its upper position and the motor circuit 509 is shown open by reason of the fact that the roller 504 of the switch arm is in engagement with the depression or low portion 516 of the cam and the contact member 512 is held out of engagement with the contact member 513 by the spring 517.

When the control handle 78 is depressed to release the brake, as described under the heading of automatic starting, stopping and controlling mechanism, the cam 515 is oscillated thus causing the high portion of the cam to engage the roller 514 and rock the switch arm on its pivotal support and close the motor circuit through the contact members 512 and 513.

When the cam-shaft 26 has made a complete revolution, the supplemental cam 104 releases the control handle 78 and allows it to return to the position shown in Fig. 17 of the drawings, thus automatically cutting off the current to the driving motor and the cam 500 is so positioned on the cam shaft 26 that it has operated to open the transformer circuit, as illustrated in Fig. 16 of the drawings.

Movable electrode return cylinder

As has been previously described, the movable electrode together with its clamp, is driven forwardly or downwardly by the cams 27. After a complete cycle of operation the movable electrode is in its forward or lower position and to return this electrode to its rear position to enable the placing of another piece of work in the machine for operation there is provided an air cylinder K which appears more clearly in Figures 1, 2 and 4 of the drawings.

This cylinder is bolted in place as clearly appears at 110 where it will be seen that the cylinder is supported upon the cross member 111 which cross member is fixed to a non-movable part of the machine.

Air is delivered into this cylinder by a suitable hose 112 from any convenient source of supply and tends to drive the piston in the cylinder rearwardly. A U-shaped frame 113 has its two ends connected to a shaft 114 which shaft in turn is carried by a bracket 115 attached to the machine portion 116 which moves with the movable electrode. The rear of the U comprises a bar 117 which extends across the rear of the cylinder K and is engaged by a protruding part of the cylinder piston.

With this construction it will be seen that when air is admitted to drive the piston rearwardly the slides and the movable electrode will be pushed or driven upwardly and rearwardly to the position which they assume before the operation of the machine is started.

Miscellaneous features

Under this heading particular attention is directed to certain parts of the machine so that the invention and the method which it practices will be more clearly understood. The two units comprising the machine are adjusted so that their rear ends are higher than their front ends for the reason that the vertical body portions comprising the sides of the vehicle have their ends curved as clearly appears in Figures 14 and 15 and the setting of the units at this angle makes it possible to bring the edges of the vehicle body sides into perfect alinement with the edges of the vehicle body back portion to which they are to be welded.

It is desirable to emphasize the absolute necessity of moving the vehicle body side portion towards the back portion in perfect alinement so that the two body portions abut each other accurately and simultaneously throughout the length of their meeting edges for otherwise the completed weld would be imperfect.

By reference to Figure 1 of the drawings the exact form of the locks 51 will be seen. It is essential that these locks be of heavy construction with firm and strong bearings as the pressure exerted upon the clamps reaches as much as fifty (50) tons. In this figure of the drawings it will be seen that each lock has long bearing supports 118 so that the locks are adequately supported to withstand hard usage and at the same time remain in perfect alinement to receive the ends 53 of the clamp bars.

By reference to Figures 10 and 11 it will be seen that the slides 43 and the castings 47 in which the plungers 49 reciprocate are made in one piece. This casting is provided with openings 119 forming the bearings for the shafts or pins 68 of the upper toggle link 65 and the opening 69 which permit the removal of the stub shaft or pin 67 from the lower toggle link 66.

Additionally the castings are provided with extensions 120 for pivotally supporting at 121 the cylinders 48 and 74 for operating the toggles as well as providing a bracket in which is a bearing 122 for supporting the ends of the equalizing shaft or bar 61.

By reason of the toggle construction it will be seen that it is necessary to pivotally support the cylinders 48 and 74 as they must rock during the operation of the toggles.

The dies 54 and 55 which are carried by the clamp bars and electrodes respectively, are made to fit one another very accurately as has been described, so that the metal of the body portion which they clamp will not be buckled or pulled at any point. This toggle feature is also essential to prevent injury to the dies. By the use of the equalizing bars on the toggles for operating the clamps the upkeep on the dies is greatly reduced as the upper die is pulled downwardly against the lower die evenly throughout the length of the die surfaces. This matter of upkeep is important as the fitting of dies for a machine of this character is a laborious undertaking and as a consequence the cost of the dies is very considerable.

As the dies on both the clamps and the electrodes are removable the machine is capable for operation upon work of different shapes or contours.

By reference to Figure 7 it will be seen that when the toggle has been operated to pull the clamp bar down into clamped position that the links 65 and 66 are close to a dead center position which in effect locks the clamp in clamped position and holds the clamps in their position irrespective of whether or not air pressure is maintained below the cylinder piston.

The motor 77 for driving the machine can be either a direct or alternating current motor in accordance with the type of electric current which is at hand for use.

The use of a brake has been described for stopping the rotation of the several shafts and gears immediately after the upsetting of the metal at the time the weld takes place. It has been found that the same braking effect could be accomplished by the use of an additional cam on the cam shaft operating a switch to momentarily energize the driving motor to drive it in a reverse direction and thus make of the drive motor a brake.

Modified form of toggle

Figure 13 of the drawings illustrates a modified form of toggle for operating the clamp bars. In this figure of the drawings the ends of the clamp bars are designated by the numeral 53 and the lock bar has the numeral 51, and the pivotal supporting bearings for the lock at 118.

In this form of toggle there is provided a cylinder 200 in which is a reciprocating piston carrying an elongated piston rod 201 having pivotal connection at 202 with an upper link 203 and a pivotal connection 204 with a lower link 205. It is intended that air be delivered to the opposite sides of the piston in the cylinder and that the control of this air be through a valve conveniently located for manual operation.

The links 203 and 205 are in a suitable casting 206 in which reciprocates a slide 207 upon the upper end of which is pivotally supported the lock 51. The upper link to the toggle is pivotally attached as at 208 to the casting 206 and the lower link 205 of the block 207$^a$ which is attached to the lower end of the slide 207 by bolts 211 passing through the elongated opening 210.

This is an adjusting block and is held firmly to the plate 207 by these bolts 211 and is further supported by an adjusting bolt 210$^a$, which is held in its set position by a lock nut 210$^b$. By reason of the bolt 210$^a$ coming up directly under the block if it is found desirable to apply a little more pressure to the welding jaws or to adjust the jaws for greater or less opening, the bolts 211 are loosened and the adjusting screw is turned up or down thus slightly raising or lowering the block 210$^a$ which will bring about the desired adjustment of the welding jaws or dies.

The cylinder 200 is swivelly mounted upon the trunnion 200$^a$ in the casting part 200$^b$ which is firmly and rigidly secured to the casting 206 by suitable bolts 212.

With the parts in the position shown in Figure 13 the clamp bars are down firmly and clamping the body back and side portions 1000 and 2000. The links have been driven or carried into the illustrated positions, by the admission of air at the rear side of the cylinder. To release the clamp air is admitted to the opposite side of the piston and the piston driven outwardly, thus pulling the adjacent ends of the links outwardly, and thereby exerting an upward pull or push through the upper link upon the plunger 207 which in turn lifts the clamp bar.

By reference to this figure of the drawings it will be seen that when the clamp is down the links are on dead center and that the clamp is accordingly locked into clamped position.

*Description of operation*

When it is desired to operate or use the machine the current is turned on for delivery to both the operating motor and to the transformer, but the operation of the machine does not start until the control handle 78 is depressed.

Prior to starting the operation the movable electrodes are in their upper position and the four clamp bars above the two stationary and two movable electrodes are swung into elevated position upon their pivotal supports, it being understood that these bars can be swung up when the locks 51 have been swung downwardly out of engagement with the reduced ends 53 of these clamps.

With the clamps or clamping bars in their elevated positions the vehicle body parts are placed in proper position upon the two units. The manner of positioning these parts is illustrated diagrammatically in Figures 14 and 15. The vehicle body back is supported upon the transverse jig 41 with its vertical edges extending beyond the dies carried upon the upper faces of the two stationary electrodes. This extension of the vertical edges of the back member is toward the movable electrodes. The vehicle body side portions are placed upon two jigs 42 and 42ª with one of their vertical edges protruding beyond the sides of the movable electrodes, this extension being on the side towards the stationary electrodes. The upper extending free ends of the vehicle side body portions are held in position by suitable clamps carried upon the upper ends of the jigs 42 and 42ª.

The four clamp bars are then swung downwardly and the four locks 51 swung upwardly so as to receive the extending ends 53 of the bars.

The next operation is to deliver air to the cylinders 74 which operate the toggles for pulling down the clamp bars above the two stationary electrodes of the two units. Air is thereafter delivered to the cylinders 64 for causing the clamp bars of the movable electrodes to firmly clamp the lower ends of the vehicle body side portions in place. The construction of the dies and the jigs is such that these vehicle body parts can be rapidly and easily placed upon the two units and the clamping effected in a very short period of time and due to the equalizing bars joining the toggle mechanism at the opposite sides of the units the metal between the dies of the electrodes and the clamps is not caused to buckle or be pulled which would cause a bad weld and at the same time injure the dies. The arrangement and construction is also such that the edges of the vehicle side body portions are in perfect alinement with the edges of the vehicle body back portion.

It will be assumed that the electrical arrangement is such that each unit is to be operated separately rather than to operate the units simultaneously, although it has been explained that the two units can be operated simultaneously, if desired.

With the vehicle body portions firmly clamped in place the operating handle 78 of one of the units is depressed, thus causing current to be delivered to the operating motor 77 which through several shafts, gear reduction box and gears, the cam shaft is caused to revolve, thereby rotating the cams 27 which are fixed thereupon. The rotation of the cams through their engagement with the cam rollers 46 causes the slow forward downward movement of the slides 43 to which is fixed the movable electrode and its clamp bar.

As the shaft 26 revolves, current is automatically turned on to the transformer through the medium of the switch operated by supplemental cam 500 mounted on the cam shaft 26.

Just before a complete revolution of the cam shaft is made the high portions 80 of the cams 27 engage the ends of the slides and cause a sudden and final downward or forward kick of these slides and the transformer switch cam mounted upon the cam shaft 26 is so positioned and timed as to cause the current to the transformer to be cut off after this push up and upsetting operation has been maintained for a short period of time.

At the movement just prior to the kick movement the edges of the vehicle body back and side portions have approached each other so closely as to cause them to lightly engage at different points therethrough their lengths and the electric current flashes between these edges and causes an intense heating of the protruding edges of these body portions. This is a natural result as the fixed and movable electrodes are in the transformer circuit and the circuit is open until the current flashes between the body portions or until the edges of the body portion actually abut. The forward final kick movement of the movable electrode is very rapid and causes the edges of the body portions to come into abutment and to be upset in the manner diagrammatically illustrated in Figure 15 of the drawings. The pressure of kick is four or five thousand pounds and as the metal at the edges of the body portions have been intensely heated, it causes these edges to upset when they come into abutment, and to bring about a homogeneous electric weld throughout the length of the abutting edges of these portions. The continued application of the welding current during this upsetting period assures a strong weld as the heating of the metal is continued for a short period after the application of pressure with the result that all pin holes in the metal are closed. The abutting edges of the body portions are of a length in excess of fifty inches. Insofar as I am aware an instantaneous flash weld or butt weld of this length has never been successfully accomplished.

The fact of the matter is that each welding job is a problem in itself, very much depending upon the transformer capacity, the amount of metal surrounding the dies and the high or low resistance of the path of the current to the transformer and to the weld. For instance, in a machine that has its operating cam properly constructed to use a high secondary voltage and rapidly force the ends of the abutting edges together, thus causing the flashing and arcing which generates the heat, will not work at all if the voltage were lower since it would do what is commonly known in the art as freezing the metal. That is the path of current flow will be so great that there will not be sufficient current flow to make the arc necessary to heat the sheet, and it will merely cause the sheets to become discolored and buckle them out of shape when the upsetting operation takes place.

This problem is one of the most difficult to overcome and it amounts to the combination of too much or not enough speed. If there is too much current and the speed of the projecting sheets is slow, it will result in the burning away of the sheet and the flashes of the current will be of a bright light, but it will not generate the heat necessary to make a proper weld, while if you have too little current the sheets will freeze. Consequently the actual construction of the actuating cam is dependent upon the transformer capacity and the speed at which the actuating cams are rotated.

However, with the proper speed and the proper current the edges of the sheets are brought slowly together, until they begin to flash and the actuating cams are so constructed that the speed rapidly increases to the point that the slide carrying the welding dies during the last 15% or 20% of its travel is going four or five times or even ten times as fast as it was moving at the start of its travel. The speed of travel of the slide is dependent entirely upon the amount of current that can be supplied to the parts that are being welded.

It is necessary and essential, however, to heat the metal of the sheets up to the point where it is very close to melting and then the high spots on the actuated cam cause the sudden kick or forcing movement which moves the slides firmly forward so as to bring the abutting and heated edges of the sheets firmly together which causes an upsetting of the sheets directly at the point of flash. The current is kept on during this period so as to continue the heating effect, but instead of causing a flash the current merely increases the heat rapidly and thereby softens the abutting metal edges during the push-up operation.

An essential part of the process and one which it is desired to emphasize is that the speed at which the weld is made, that is the speed of travel or push-up kick of the slides, due to the raised portions of the cams, shall be accelerated after the sheets begin to flash or the abutting edges begin to flash to a point where they are moving as rapidly as it is possible to do and not freeze the weld up to the point of the final kick. This acceleration of the speed will be dependent absolutely on the current supplied. This acceleration during the heating period is essential to a satisfactory weld and a speed increase as much as ten times the initial starting speed of the slides has been used very successfully in the electric welding of thin sheets.

Continuing the description of the operation, it will be seen that upon the forward final kick movement, the cam 104 has been brought into position to cause the trigger 105 to release the lock bar 99 from engagement with the pin 102, thereby allowing the spring 96 to automatically expand the internal brake members 91 and 92 and the handle 78 to rise and brake the motor circuit, thereby stopping all rotation of the driving mechanism of the unit.

The supplemental cam 500 carried by the cam shaft is so timed with relation to the cam shaft and the switch that it operates the switch at the instant the final kick movement to cut off the current to the transformer.

A complete cycle of one unit has now been accomplished and it remains only to repeat this cycle in respect to the other unit of the machine to accomplish a weld at the opposite edge of the body back portion.

When the second unit has been put through a cycle of operation, air is delivered to the toggle operating cylinders to release the pressure upon the clamp bars. Pressure upon the clamp bars being released, the locks 51 can be swung outwardly and downwardly and the clamp bars swing upwardly to permit removal of the completed work.

Upon the removal of the completed work air is delivered to the return cylinders K to return the movable electrodes to their elevated or starting positions, and the machine is ready to go through another cycle of operation in respect to the welding together of another vehicle body.

A machine built in accordance with this invention has been in actual use and has proved highly efficient in operation. Although the machine is not automatic in respect to all of its operations, the machine has been known to complete between fifty and sixty complete welding jobs or operations per hour.

The sale of a machine of this type is to automobile body manufacturers and to be commercially successful, must be highly efficient and successfully pass rigid tests. The present machine passes these tests.

Each completed weld when removed from the machine is put through the severe test of bending the weld. A mallet with a wedged shaped end is placed upon the welded portion and this portion bent downwardly or outwardly throughout its length and after having been so bent, a device with a flat end is placed upon the bent portion and hammered to cause the bent portion to be again straightened out. This test has to be passed before the job is passed onwardly through the factory for its final completion.

Having thus described my invention, what I desire to claim and secure by Letters Patent of the United States is:

1. An apparatus for welding the back and side portions of an automobile body together comprising electrodes having associated therewith vertically movable clamping bars for clamping and maintaining the adjacent edges of the body portions in perfect alignment with each other on said electrodes, an electric welding circuit including said electrodes, one of said electrodes in separated relation in respect to the other and movable to and from the same, toggles at the ends of the clamping bars and having operative connection therewith for raising and lowering them, cylinders having therein pistons for operating said toggles, an equalizing bar interconnecting said pistons, means for moving the movable electrode towards the stationary electrode to bring the edges of the body portions into abutment under pressure, and means for turning off the electric welding current after said abutment occurs and the weld is completed.

2. An apparatus for welding the back and sides of an automobile vehicle body together comprising a unit having mounted thereon a fixed electrode and a movable electrode both of which are in an electric welding circuit, plungers at the opposite ends of said electrodes, clamp-bars mounted above said electrodes and pivotally connected at one end to the plunger at one side of the unit, locks attached to the plungers at the opposite side of the unit and adapted to be moved into engagement with the free ends of said clamp bars to clamp the vehicle body parts between the respective electrodes and clamp bars, a toggle operatively connected with each plunger for raising and lowering the same, a cylinder having therein a pressure operated piston for operating each of the toggles, and an equalizing bar interconnecting the pistons at the opposite sides of the unit, whereby the clamp bars are moved at the same speed throughout their length through the action of either of the pistons.

3. A welding apparatus of the character described comprising a pair of independent welding units mounted in separated relation upon a common base, means to move said units laterally on said base towards and away from one another, the adjacent ends of said units universally supporting in respect to said base, means to raise and lower the rear ends of said units, and means to move the rear ends of said units transverse the base, whereby said units are adjustable in respect to one another for the purpose of adapting the machine for operation upon work of a diversified character and of diversified shapes.

4. An apparatus for welding the back and side portions composing an automobile body together comprising a pair of welding units mounted in separated and adjustable relation one to the other, said units provided with fixed electrodes and movable electrodes both of which are in an electric welding circuit, the stationary electrodes of the two units serving as a support for the body back portions and the movable electrodes of the two units serving as a support for the body side portions, plungers mounted at the opposite ends of all of said electrodes, a clamp bar for each of said electrodes, said clamp bars being pivotally mounted upon the plungers at one side of the units, movable locks mounted upon the plungers at the opposite sides of the units and adapted to receive and lock the free ends of the clamp bars, a toggle for reciprocating each of said plungers, pressure operated pistons for actuating each of said toggles, an equalizing bar interconnecting the pistons oppositely positioned at the opposite sides of the units, said clamps clamping said vehicle body portions adjacent their vertical edges firmly in place upon the electrodes in perfect alignment with each other, means to move the movable electrodes towards the stationary electrodes to bring the edges of the body side portions into an abutment under pressure with the edges of the body back portion, and means automatically cutting off the welding current after said pressure abutment of the edges of the body portions, whereby a homogeneous weld of the body portions one to the other is made throughout the length of their abutting edges.

5. An apparatus for welding the previously shaped back and side portions composing an automobile body together, comprising a pair of welding units mounted in separated relation one to the other, each of said units provided with fixed electrodes and movable electrodes, all of said electrodes being in an electrical welding circuit, means for clamping the body back portion upon the stationary electrodes and means for clamping the body side portions upon the movable electrodes with the clamped portions of the body parts in perfect alignment with each other, means to move the movable electrodes slowly towards the stationary electrodes, means to turn on the welding current during said movement, means to give a final sudden movement of the movable electrodes towards the stationary electrodes to bring the edges of the body side portions into abutment under pressure with the edges of the body back portion, means for automatically cutting off the electric current, after said abutment under pressure, means to arrest all movement of the electrodes at the time the said final sudden forward movement is ended, and means to return the movable electrodes to their original positions in separated relation to the fixed electrodes.

6. A welding apparatus of the character described comprising a pair of independent welding units mounted in separated relation, means to move said units towards and away from one another, means to raise and lower the rear ends of said units, and means to swing the rear ends of said units transverse their supports, whereby said units are adjustable towards and away from one another and also angularly in respect to one another for the purpose of adapting the machine for operation upon work of a diversified character and of diversified shapes and dimensions.

7. In an apparatus for welding the back and side portions of an automobile body together comprising electrodes having associated therewith movable clamping members for clamping and maintaining the adjacent edges of the body portions in perfect alinement with each other on said electrodes, means at each side of said apparatus having operative connection with said clamping members for moving them into clamped and unclamped relation with said electrodes, and an equalizing connection between said clamp operating means for causing an equal pressure of the clamps upon the work at all points.

8. In an apparatus for welding the back and side portions of an automobile body together comprising electrodes having associated therewith movable clamping bars for clamping and maining the adjacent edges of the body portion in perfect alinement with each other on said electrodes, toggles at the opposite sides of said apparatus and having operative connection with said clamping bars for moving them, means for operating said toggles, and an equalizing bar connecting said toggle operating means to cause the clamping bars to engage the body portions of the work at an equal pressure at all points.

9. In an apparatus for welding the back and side portions of an automobile body together comprising electrodes having associated therewith movable clamping bars for clamping and maintaining the adjacent edges of the body portions in perfect alinement with each other on said electrodes, toggles at the opposite sides of said apparatus and having operative connection with said clamping bars, means for operating said toggles, said operating means adapted to carry said toggles into a position past dead center when moving the clamping bars into a clamped position whereby the bars are locked in their clamped positions and an equalizing connection between the toggle operating means at the opposite sides for causing said clamping bars to engage the body portions at an equal pressure at all points.

10. In an apparatus for welding the back and side portions of an automobile body together comprising an electrode having associated therewith vertically movable clamping bars for clamping and maintaining the adjacent edges of the body portions in perfect alinement with each other on said electrodes, guides at each side of said apparatus, rods in the said guides having their upper ends connected to the said clamping bars, toggles at each side of said apparatus comprising a pair of links having their adjacent ends connected with an operating mechanism, the free end of one of said links having fixed pivotal connection to the said guide-way and the free ends of said other links having pivotal connection with said clamping bar rods, for the purpose described.

11. In an electrical welding machine, a table carrying a die for clamping the work, a cross-beam spanning said table carrying a co-operating clamping die, guides at the opposite sides of the table, slides operating in said guides, connections between said beam and said slides, power transmitting means at opposite sides of the table, toggle links connecting the slides and said power transmitting means, and an equalizing connection between the power transmitting means for causing an equal pressure of the beam upon the work at all points.

12. An apparatus for welding together the back and side portions of automobile bodies, comprising combined electrodes and clamping dies, an electric circuit including the said electrodes, means for maintaining the body portions on said electrodes with their adjacent edges in perfect alinement with each other, manual means for starting the operation of the apparatus, automatic mechanical means for turning on an electric current to said electrodes, automatic mechanical means for advancing the electrodes and automobile body portions towards one another to cause an electrical flash heating of the edges of said body portions, mechanical means for forcing the heated edges together under pressure to bring about a weld throughout their length, mechanical means for automatically cutting off the electric current and to arrest all movement of the electrodes immediately after the heated edges of the body portions have been forced together and the weld completed, and manually controlled fluid pressure means for returning the electrodes to their original starting position.

13. A welding apparatus comprising a horizontally arranged base, a pair of welding units mounted on said base in separated relation, the adjacent edges of said units universally supported upon blocks slidable laterally on said base, the remote ends of said units pivotally and vertically adjustably supported upon blocks movable transverse the base, means to move the blocks supporting the adjacent edges of said units towards and away from one another, means to raise and lower the remote ends of the units, and means to move transverse the base the blocks supporting the remote ends of the units, for the purpose described.

14. In an electric welding machine, a stationary electrode and a movable electrode, means to clamp upon said electrodes the work intended to be welded, driving means for moving said movable electrode towards said stationary electrode, a brake normally locking said movable electrode driving means against movement, means to release said brake, and automatic means for setting said brake at a predetermined time, for the purpose described.

15. In an electric welding machine, a fixed electrode and a movable electrode, means to clamp the work to be welded upon said electrodes, a driving motor having connection with said movable electrode for moving the same towards said fixed electrode, a brake normally engaging the connection between the driving motor and the movable electrode to prevent movement of the same, means to release said brake, and means driven by said motor for automatically setting the brake and stopping the movement of the driving means at a predetermined time.

16. An apparatus for welding together the back and side portions comprising an automobile body, comprising a pair of welding units mounted in separated relation, said units at their adjacent sides provided with fixed electrodes and said units back of said fixed electrodes provided with movable electrodes, the fixed electrodes of the two units serving to support the body back portion and the movable electrodes each serving as a support for a body side portion, clamps cooperating with all of said electrodes to clamp the body portions in the position specified, and means to move the movable electrodes towards the fixed electrodes to effect a welding together of the body, side and back portions respectively.

17. In an electrical welding machine, a movable table, separate sets of dies, for clamping the work and conducting electric current thereto, said dies extending transversely of said table, separate sets of adjustable toggle devices mounted in slides at opposite sides of said table for operating said separate sets of dies, and separate cylinders and pistons for operating said toggle devices, said toggle devices including stationary blocks adjustably mounted in said slides.

18. In an electrical welding machine, a table carrying a die for clamping the work, a cross beam spanning said table carrying a companion clamping die, vertical guides at opposite sides of the table, slides operating in said guides, connections for said beam and slides, toggle links connecting the slides and beam, and power-transmitting means at opposite sides of the table for buckling said toggle links.

19. In an electrical welding machine, a table having guide housings depending therefrom at opposite sides thereof, vertically-movable slides confined within said guide housings, a cross beam hinged to one slide and detachably connected to the second slide on the opposite side of said table, companion dies mounted upon said beam and table for clamping the work and conducting an electric welding current thereto, toggle links connected adjustably to each slide and their respective housings, a piston operatively connected to the toggle links for each slide, and cylinders for said pistons, said cylinders being movably supported to accomodate buckling movements of said links.

20. An electrical welding machine, comprising movable and stationary tables, slides vertically arranged at opposite sides of said table, work clamping dies carried by said slides and tables, toggle devices each including a stationary member adjustably connected with its slide for adjusting the range of the toggle device, and means for actuating said toggle devices.

21. An electrical welding machine, comprising two horizontally-inclined tables, slides suspended vertically from opposite sides of said tables, cross beams hinged to said slides, co-operating dies for clamping the work and conducting electric current thereto secured to said beams and tables, and toggle means for operating each slide, including a fluid-operated piston.

22. An electrical welding machine, comprising a frame, a fixed table and a movable table mounted upon said frame, slides and guiding means for said slides extending downwardly from said tables at each side thereof, a pair of cross beams affixed to separate pairs of said slides, electro-current-conducting dies secured to said tables, companion clamping dies fixed to said beams, and fluid-operated toggle means mounted at opposite sides of said frame upon the table beneath the top plane thereof for operating said slides.

23. An electrical welding machine, comprising a base frame, a supplemental frame mounted in a horizontally-inclined position on said base frame, separate tables mounted upon said supplementary frame carrying current conductors and dies, means for shifting one table relatively to the other table, slides and supporting guides therefor carried by each table at opposite sides of said frame, cross beams connected to the upper ends of said slides, clamping dies carried by said beams, toggle links connecting said slides and their supports, and cylinders having pistons therein operatively connected to said links.

24. In an electrical welding machine, a table, a pair of slides vertically arranged at opposite sides of said table, a beam hinged at one end to one of said slides and yoked at its opposite end to the second slide, a support for each slide, a movable block and an adjusting screw connected to each slide support, separate sets of toggle links connected to said blocks and said supports, and separate cylinders containing power-transmitting pistons operatively connected to said links.

25. In an electrical welding machine, an elongated die extending transverse the machine; a second die arranged above said first die and extending across the machine, said second die supported upon vertically slidable members at opposite sides of the machine, and means at opposite sides of the machine for moving said second die for clamping the work between the dies.

26. In an electric welding machine, a lower die extending across the machine, an upper die extending across the machine above said lower die, vertically movable members at opposite sides of the machine for supporting said upper die, a toggle link arrangement connected to said movable members, and power transmitting means at opposite sides of the table for buckling said toggle links, for the purpose described.

27. In an electrical welding machine, vertically arranged guide housings at opposite sides thereof, vertically movable slides within said housing, a cross beam hinged to one slide and detachably connected to the second slide at the opposite side of the machine, companion dies mounted upon said beam and machine for clamping the work and conducting an electric welding current thereto, toggle links for each slide and a fluid operated piston for buckling said toggle links to cause said action.

In testimony whereof I hereunto affix my signature.

FRED P. McBERTY.